United States Patent [19]
Greenberg

[11] Patent Number: 5,158,602
[45] Date of Patent: Oct. 27, 1992

[54] METHOD AND APPARATUS FOR SEPARATING COPPER FROM CHROMITE

[75] Inventor: Bernard Greenberg, Brooklyn, N.Y.

[73] Assignee: Diversified Recycling Technology, Valencia, Calif.

[21] Appl. No.: 836,416

[22] Filed: Feb. 18, 1992

[51] Int. Cl.$^5$ .............................................. C22B 34/00
[52] U.S. Cl. ...................................... 75/416; 266/217
[58] Field of Search ............................ 75/426; 266/217

[56] References Cited

U.S. PATENT DOCUMENTS

| | | | |
|---|---|---|---|
| 2,316,330 | 4/1943 | Hawk | 75/416 |
| 2,905,546 | 9/1959 | Harris | 75/416 |

Primary Examiner—Peter D. Rosenberg
Attorney, Agent, or Firm—Thomas I. Rozsa

[57] ABSTRACT

The present invention is a method for separating copper (II) from chromite in a material containing both copper (II) and chromite. The present invention separation method essentially comprises the steps of: (a) extracting the material with a combined hot vapor-liquid phase of volatile carboxylic acid to dissolve the copper (II) as cupric carboxylate, thereby removing the copper (II) from the material; and (b) crystallizing the cupric carboxylate. The present invention method may further comprise the step of reducing the chromite in the remaining material to chromium metal by reduction with hydrogen at about 1500° C. Preferably, the substantially volatile carboxylic acid is acetic acid. The present invention method and apparatus is useful for treatment of exhausted catalyst pellets containing copper (II) and chromite and recovering both copper and chromium in a useful form from the pellets.

22 Claims, 1 Drawing Sheet

METHOD AND APPARATUS FOR SEPARATING COPPER FROM CHROMITE

BACKGROUND OF THE INVENTION

1. Field of The Invention

The present invention relates to the field of separating copper (II) from used industrial catalysts which contain copper (II) and other metals. More particularly the present invention relates to the field of separating copper (II) from chromite in materials containing both metals.

2. Description of The Prior Art

Large quantities of catalysts containing copper (II) and chromite are used in many industrial processes, particularly for hydrogenation. These catalysts eventually become poisoned and must be discarded. Millions of pounds of such catalysts are discarded each year in the United States. Not only does the disposal of this used catalyst, typically in landfills, lead to environmental problems caused by leaching of the metals, with eventual contamination of groundwater, but disposal of these catalysts also represents a substantial economic loss. Both copper and chromium have considerable value, with copper selling for approximately $0.75–$1.00/pound and chromium being of at least comparable value.

However, there currently exists no commercially viable process for the separation of copper from chromite in a catalyst containing both copper and chromite. Thus, there is a need for a simple and economical process that can be used to separate copper from chromite and recover copper. Preferably, such a process should also be able to recover the chromite as chromium metal.

SUMMARY OF THE INVENTION

The present invention is a method and apparatus for separating copper (II) from chromite in materials containing both metals.

More particularly, the present invention is a method for separating copper as a carboxylic acid salt of cupric ion from a material containing both copper (II) and chromite which allows the separation of copper from chromite and the recovery of copper.

In general, the present invention method comprises the steps of:

(a) extracting a material with a combined hot vapor-liquid phase of a substantially volatile carboxylic acid to dissolve the copper (II) as cupric carboxylate, thereby removing the copper (II) from the material; and (b) crystallizing the cupric carboxylate.

The present invention method comprises particularly the steps of:

(a) extracting a material with a hot vapor phase of a substantially volatile carboxylic acid to dissolve the copper (II) as cupric carboxylate, thereby removing the copper (II) from the material; and (b) crystallizing the cupric carboxylate.

The present invention method comprises alternatively the steps of:

(a) extracting a material with a hot liquid phase of a substantially volatile carboxylic acid to dissolve the copper (II) as cupric carboxylate, thereby removing the copper (II) from the material; and (b) crystallizing the cupric carboxylate.

The substantially volatile carboxylic acid can be selected from the group consisting of straight- or branched-chain carboxylic acids having from 1 to 4 carbon atoms. Preferably, the substantially volatile carboxylic acid is acetic acid.

The present invention method may also comprise the step of reducing the chromite in the material from which the copper (II) has been removed to chromium metal by reduction with hydrogen at about 1500° C. This allows recovery of the chromium present in the starting material as well as of the copper.

The present invention method may further comprise the step of removing organic residues from the used catalyst material, if the used catalyst material contains such organic residues.

The starting material can comprise a copper-chromite catalyst on an inert support.

A particularly preferred version of the present invention method comprises the steps of:

(a) extracting a material with a combined hot vapor-liquid phase of acetic acid to dissolve the copper (II) as cupric acetate, thereby removing the copper (II) from the material;

(b) crystallizing the cupric acetate; and (c) reducing the chromite in the material from which the copper (II) has been removed to chromium metal by reduction with hydrogen at about 1500° C.

The present invention also comprises an apparatus suitable for the extraction of a copper-chromite containing material with a substantially volatile carboxylic acid. Such an apparatus comprises:

(a) means for extracting the material with a combined hot vapor-liquid phase of a substantially volatile carboxylic acid to dissolve the copper (II) as cupric carboxylate, thereby removing the copper (II) from the material; and (b) means for crystallizing the cupric carboxylate.

The apparatus utilized in the present invention separation method, which is suitable for the extraction of a copper-chromite containing material with a substantially volatile carboxylic acid, may also comprise:

(a) means for extracting the material with a hot vapor phase of a substantially volatile carboxylic acid to dissolve the copper (II) as cupric carboxylate, thereby removing the copper (II) from the material; and (b) means for crystallizing the cupric carboxylate.

The apparatus utilized in the present invention separation method, which is suitable for the extraction of a copper-chromite containing material with a substantially volatile carboxylic acid, may alternatively comprise:

(a) means for extracting the material with a hot liquid phase of a substantially volatile carboxylic acid to dissolve the copper (II) as cupric carboxylate, thereby removing the copper (II) from the material; and (b) means for crystallizing the cupric carboxylate.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Figure 1:
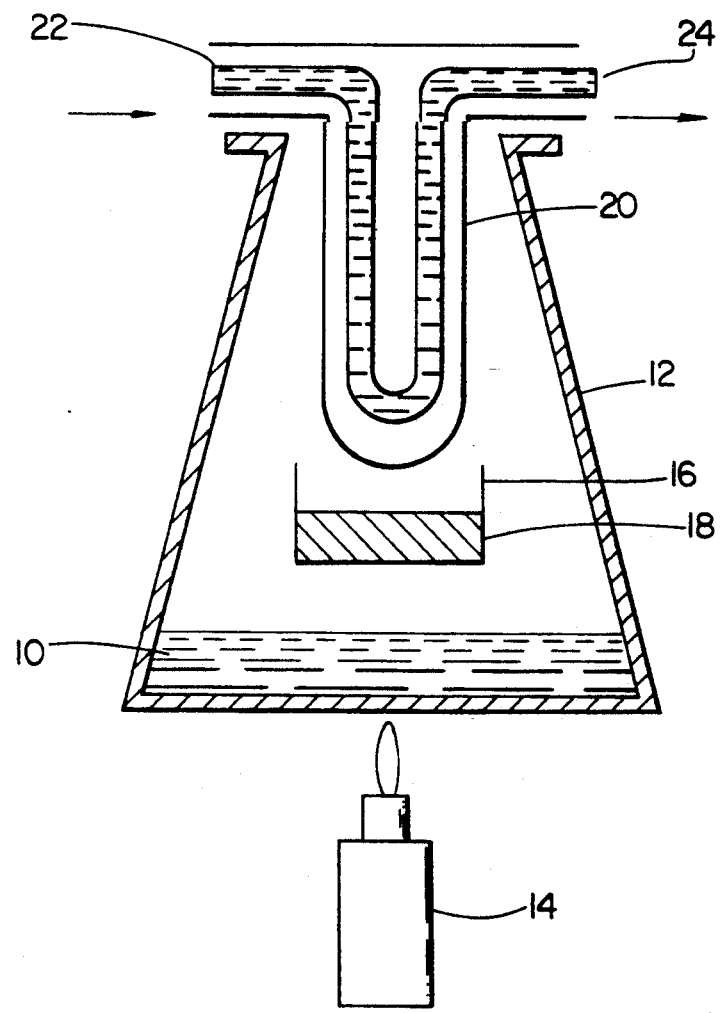
FIG. 1 is a block diagram of an extraction apparatus useful in a the practice of the present invention separation method.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

A method for recovery of copper as a carboxylic acid salt of cupric ion meets needs described above. The method is based on the extraction of cupric ion from copper-chromite containing material with a combined hot vapor-liquid phase containing a substantially volatile carboxylic acid. This dissolves the copper as a carboxylic acid salt of cupric ion and removes the copper from the copper-chromite containing material. The concentration of cupric salt then builds up in a reservoir of the carboxylic acid and eventually crystallizes therefrom. The remaining material from which the copper has been removed still contains chromium as chromite, i.e. in the +3 oxidation state. The chromite can then be reduced to metallic chromium by reduction with hydrogen at about 1500° C.

The following is a step-by-step description of the basic procedures of the present invention.

I. Conversion of Copper (II) to Cupric Salt of a Carboxylic Acid

The first step of the present invention separation method is the conversion of the cupric ion in the copper-chromite containing material to a cupric salt of a volatile carboxylic acid. The copper-chromite containing material is extracted with a hot combined vapor-liquid phase of a substantially volatile carboxylic acid. This dissolves the copper as the cupric salt of the carboxylic acid and thereby removes the copper from the material. At this stage, the chromium remains in the material. The carboxylic acid used is preferably a straight or branched-chain carboxylic acid having from 1 to 4 carbon atoms. Suitable carboxylic acids include formic acid, acetic acid, propionic acid, butyric acid, and isobutyric acid.

The boiling points of these acids range from 100.5° C. for formic acid to 164° C. for butyric acid. Therefore, the extraction in the combined vapor-liquid phase takes place at a temperature exceeding this boiling point. Preferably, this substantially volatile carboxylic acid is acetic acid, most preferably used as glacial acetic acid. In addition, it will be appreciated that the extraction process may be taken place in a vapor phase or a liquid phase of the substantially volatile carboxylic acid depending on the pressure and temperature maintained in the boiling process.

Suitable starting materials for the present invention separation method include any compositions containing both copper in the cupric (+2) oxidation state and chromite. The compositions can contain an inert support such as alumina or silica. A suitable starting material is catalyst pellets, such as those used for hydrogenation, containing copper as cupric ion and chromite on an inert support.

In some applications, particularly for the treatment of poisoned catalyst pellets covered with a film, sludge, or residue of organic material, it is desirable to treat the pellets with a nonpolar organic solvent to remove the film, sludge, or residue before beginning the extraction process. Such suitable nonpolar organic solvents may include, but are not limited to, toluene, benzene, and petroleum ether.

A suitable apparatus for the extraction of the copper-chromite containing material with the substantially volatile carboxylic acid is shown in FIG. 1.

Referring to FIG. 1, the substantially volatile carboxylic acid 10, such as acetic acid, is contained in an extraction flask 12. The extraction flask 12 is heated by a heating source 14. Within the extraction flask 12 is placed an extraction thimble 16, containing the material to be extracted, such as copper-chromite pellets 18. Adjacent to the extraction thimble is a cold finger 20 which is fed by a water inlet 22. The water leaves the cold finger by way of a water outlet 24.

The extraction flask 12 is heated with the heating source 14. The acetic acid 10 is partially or completely vaporized and condenses on the cold finger 20, where it drips through the copper-chromite pellets 18 contained in the extraction thimble 16. This dissolves the copper as a cupric carboxylate salt. The carboxylic acid then returns to the reservoir of acid 10 in the extraction flask 12. The concentration of cupric salt in the reservoir 10 builds and solid cupric acetate salt crystallizes out. The extraction continues until the copper content of the pellets is exhausted. The extraction typically requires from about 30 minutes to about 12 hours, preferably from about 1 hour to about 6 hours.

This extraction removes the copper from the copper-chromite containing material. Once the copper has thus been separated from the chromite, the remaining chromite can be reduced to chromium metal as discussed below.

II. Reduction of the Chromite to Chromium

The remaining chromite in the copper-chromite containing material from which the copper has been extracted is then reduced to chromium metal by hydrogen at about 1500° C. This reaction preferably takes place in a reaction chamber constructed of refractory compounds such as borides, carbides, or nitrides. Reduction of chromite to chromium metal is well understood in the art.

The present invention may further comprise the step of removing organic residues from the used catalysts.

The present invention provides a simple and efficient way of extracting the copper from copper-chromite containing materials such as hydrogenation catalyst pellets. The present invention separation method allows the recovery of both the copper and chromium from the used pellets, and eliminates the need to dispose of such materials containing heavy metals, as in a landfill.

Although the present invention has been described in considerable detail with reference to certain preferred versions thereof, other versions are possible. Therefore, the spirit and scope of the appended claims should not be limited to the description of the preferred versions contained herein.

Defined in detail, the present invention is a method for separating copper (II) from chromite in a material containing copper (II) and chromite, the method comprising: (a) extracting said material with a combined hot vapor-liquid phase of acetic acid to dissolve said copper (II) as cupric acetate, thereby removing said copper (II) from said material; (b) crystallizing said cupric acetate; and (c) reducing said chromite in said material from which said copper (II) has been removed to chromium metal by reduction with hydrogen at about 1500° C.

Defined broadly, the present invention is a method for separating copper (II) from chromite in a material containing copper (II) and chromite, the method comprising: (a) extracting said material with a combined hot vapor-liquid phase of a substantially volatile carboxylic acid to dissolve said copper (II) as cupric carboxylate, thereby removing said copper (II) from said material; and (b) crystallizing said cupric carboxylate.

Defined also broadly, the present invention is an apparatus for separating copper (II) from chromite in a material containing copper (II) and chromite, the apparatus comprising: (a) means for extracting said material with a combined hot vapor-liquid phase of a substantially volatile carboxylic acid to dissolve said copper (II) as cupric carboxylate, thereby removing said copper (II) from said material; and (b) means for crystallizing said cupric carboxylate.

Defined alternatively in detail, the present invention is a method for separating copper (II) from chromite in a material containing copper (II) and chromite, the method comprising: (a) extracting said material with a hot vapor phase of acetic acid to dissolve said copper (II) as cupric acetate, thereby removing said copper (II) from said material; (b) crystallizing said cupric acetate; and (c) reducing said chromite in said material from which said copper (II) has been removed to chromium metal by reduction with hydrogen at about 1500° C.

Defined alternatively and broadly, the present invention is a method for separating copper (II) from chromite in a material containing copper (II) and chromite, the method comprising: (a) extracting said material with a hot vapor phase of a substantially volatile carboxylic acid to dissolve said copper (II) as cupric carboxylate, thereby removing said copper (II) from said material; and (b) crystallizing said cupric carboxylate.

Defined also alternatively and broadly, the present invention is an apparatus for separating copper (II) from chromite in a material containing copper (II) and chromite, the apparatus comprising: (a) means for extracting said material with a hot vapor phase of a substantially volatile carboxylic acid to dissolve said copper (II) as cupric carboxylate, thereby removing said copper (II) from said material; and (b) means for crystallizing said cupric carboxylate.

Defined further alternatively in detail, the present invention is a method for separating copper (II) from chromite in a material containing copper (II) and chromite, the method comprising: (a) extracting said material with a hot liquid phase of acetic acid to dissolve said copper (II) as cupric acetate, thereby removing said copper (II) from said material; (b) crystallizing said cupric acetate; and (c) reducing said chromite in said material from which said copper (II) has been removed to chromium metal by reduction with hydrogen at about 1500° C.

Defined further alternatively and broadly, the present invention is a method for separating copper (II) from chromite in a material containing copper (II) and chromite, the method comprising: (a) extracting said material with a hot liquid phase of a substantially volatile carboxylic acid to dissolve said copper (II) as cupric carboxylate, thereby removing said copper (II) from said material; and (b) crystallizing said cupric carboxylate.

Defined again alternatively and broadly, the present invention is an apparatus for separating copper (II) from chromite in a material containing copper (II) and chromite, the apparatus comprising: (a) means for extracting said material with a hot liquid phase of a substantially volatile carboxylic acid to dissolve said copper (II) as cupric carboxylate, thereby removing said copper (II) from said material; and (b) means for crystallizing said cupric carboxylate.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method for separating copper (II) from chromite in a material containing copper (II) and chromite, the method comprising:
   a. extracting said material with a combined hot vapor-liquid phase of acetic acid to dissolve said copper (II) as cupric acetate, thereby removing said copper (II) from said material;
   b. crystallizing said cupric acetate; and
   c. reducing said chromite in said material from which said copper (II) has been removed to chromium metal by reduction with hydrogen at about 1500° C.

2. The invention as defined in claim 1 wherein said material comprises a copper-chromite catalyst on an inert support.

3. The invention as defined in claim 1 further comprising the step of removing organic residues from said material.

4. A method for separating copper (II) from chromite in a material containing copper (II) and chromite, the method comprising:
   a. extracting said material with a combined hot vapor-liquid phase of a substantially volatile carboxylic acid to dissolve said copper (II) as cupric carboxylate, thereby removing said copper (II) from said material; and
   b. crystallizing said cupric carboxylate.

5. The invention as defined in claim 4 wherein said substantially volatile carboxylic acid is selected from the group consisting of straight- or branched-chain carboxylic acids having from 1 to 4 carbon atoms.

6. The invention as defined in claim 5 wherein said substantially volatile carboxylic acid is acetic acid.

7. The invention as defined in claim 4 further comprising the step of reducing said chromite in said material from which said copper (II) has been removed to chromium metal by reduction with hydrogen at about 1500° C.

8. The invention as defined in claim 4 wherein said material comprises a copper-chromite catalyst on an inert support.

9. The invention as defined in claim 4 further comprising the step of removing organic residues from said material.

10. An apparatus for separating copper (II) from chromite in a material containing copper (II) and chromite, the apparatus comprising:
   a. means for extracting said material with a combined hot vapor-liquid phase of a substantially volatile carboxylic acid to dissolve said copper (II) as cupric carboxylate, thereby removing said copper (II) from said material; and
   b. means for crystallizing said cupric carboxylate.

11. The invention as defined in claim 10 further comprising means for reducing said chromite in said material from which said copper (II) has been removed to chromium metal by reduction with hydrogen at about 1500° C.

12. The invention as defined in claim 10 further comprising means for removing organic residues from said material.

13. A method for separating copper (II) from chromite in a material containing copper (II) and chromite, the method comprising:
   a. extracting said material with a hot vapor phase of acetic acid to dissolve said copper (II) as cupric acetate, thereby removing said copper (II) from said material;
   b. crystallizing said cupric acetate; and
   c. reducing said chromite in said material from which said copper (II) has been removed to chromium metal by reduction with hydrogen at about 1500° C.

14. The invention as defined in claim 13 wherein said material comprises a copper-chromite catalyst on an inert support.

15. The invention as defined in claim 13 further comprising the step of removing organic residues from said material.

16. A method for separating copper (II) from chromite in a material containing copper (II) and chromite, the method comprising:
   a. extracting said material with a hot vapor phase of a substantially volatile carboxylic acid to dissolve said copper (II) as cupric carboxylate, thereby removing said copper (II) from said material; and
   b. crystallizing said cupric carboxylate.

17. An apparatus for separating copper (II) from chromite in a material containing copper (II) and chromite, the apparatus comprising:
   a. means for extracting said material with a hot vapor phase of a substantially volatile carboxylic acid to dissolve said copper (II) as cupric carboxylate, thereby removing said copper (II) from said material; and
   b. means for crystallizing said cupric carboxylate.

18. A method for separating copper (II) from chromite in a material containing copper (II) and chromite, the method comprising:
   a. extracting said material with a hot liquid phase of acetic acid to dissolve said copper (II) as cupric acetate, thereby removing said copper (II) from said material;
   b. crystallizing said cupric acetate; and
   c. reducing said chromite in said material from which said copper (II) has been removed to chromium metal by reduction with hydrogen at about 1500° C.

19. The invention as defined in claim 18 wherein said material comprises a copper-chromite catalyst on an inert support.

20. The invention as defined in claim 18 further comprising the step of removing organic residues from said material.

21. A method for separating copper (II) from chromite in a material containing copper (II) and chromite, the method comprising:
   a. extracting said material with a hot liquid phase of a substantially volatile carboxylic acid to dissolve said copper (II) as cupric carboxylate, thereby removing said copper (II) from said material; and
   b. crystallizing said cupric carboxylate.

22. An apparatus for separating copper (II) from chromite in a material containing copper (II) and chromite, the apparatus comprising:
   a. means for extracting said material with a hot liquid phase of a substantially volatile carboxylic acid to dissolve said copper (II) as cupric carboxylate, thereby removing said copper (II) from said material; and
   b. means for crystallizing said cupric carboxylate.

* * * * *